BEST AVAILABLE COPY

F. BRENZINGER.

Ventilators.

No. 6,160. Reissued Dec. 8, 1874.

Witnesses:
Chas. Wahlers.
Henry Gentner

Inventor:
Francis Brenzinger
per
Van Santvoord & Hauff
Attys

THE GRAPHIC CO. PHOTO-LITH. 308 & 44 PARK PLACE, N.Y.

UNITED STATES PATENT OFFICE.

FRANCIS BRENZINGER, OF NEW YORK, N. Y.

IMPROVEMENT IN VENTILATORS.

Specification forming part of Letters Patent No. 147,095, dated February 3, 1874; reissue No. 6,160, dated December 8, 1874; application filed October 28, 1874.

*To all whom it may concern:*

Be it known that I, FRANCIS BRENZINGER, of the city, county, and State of New York, have invented a new and useful Improvement in Ventilators, of which the following is a specification:

This invention consists in a centrifugal exhaust-fan arranged horizontally above a chimney or other flue, in combination with an atmospheric motor-fan arranged above and below said exhaust-fan, in such a manner that, by the action of the external air upon said motor-fan, a revolving motion is imparted to the exhaust-fan, whereby a suction is created within the flue, and by this means a uniform and constant ventilation is insured.

This invention is illustrated in the accompanying drawing, in which—

Figure 1:
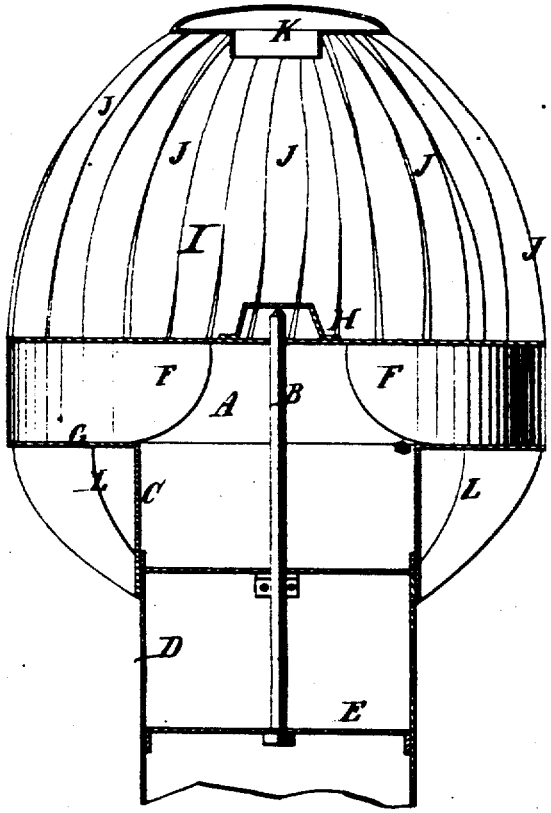
Figure 2:
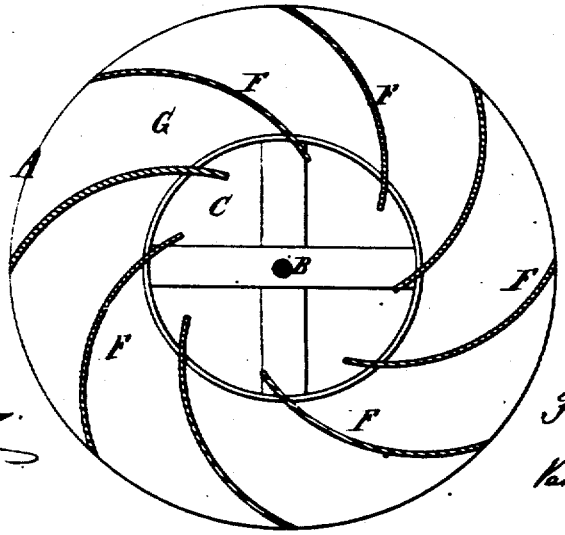

Figure 1 represents a vertical central section. Fig. 2 is a horizontal section in the plane *x x*, Fig. 1.

Similar letters of reference indicate corresponding parts.

The letter A designates a ventilator or exhaust fan, which revolves on a vertical shaft or spindle, B, and the inner end of which communicates through a cylinder, C, formed beneath it, with a flue or conduit, D. This flue extends into the loose or revolving cylinder C, and contains a cross-bar, E, which forms the step of the spindle B. Said ventilator-fan is composed of a series of blades, F, (see Fig. 2,) which are secured between a flange or plate, G, of the cylinder C, and a top plate, H, by which latter the ventilator is made also to shed water. The inner ends of the blades F terminate within the circle of the cylinder C and of the flue, and their lower edges are rounded off from the top edge of said cylinder. By this means the air in the flue D is brought within the scope of the blades F of the fan, and by revolving said fan the air is taken up and expelled by centrifugal force at the ends of the blades, so as to create a suction within the flue. Motion is imparted to the ventilator-fan A by a fan, I, through the medium of the atmosphere—that is to say, such motor-fan receives a revolving motion when exposed to the action of a current of air or wind. This latter fan is secured upon the ventilator-fan A, and is also composed of a series of blades, J, whose direction, however, is opposite to that of the blades of the ventilator-fan. The motor-fan I has a larger effective area than the ventilator-fan, so as to insure its operation. The blades J of the motor-fan are arranged in a circle on the edge or rim of the top plate H, and, extending spirally upward and inward, terminate beneath a cap, K, whereby they are held together. Auxiliary curved blades L are also arranged beneath the plate G on the outside of the cylinder C, to further increase the surface or area of the motor-fan.

By this arrangement the operation of my ventilator is insured at all times, since the motor-fan, when in the open air, is exposed on all of its sides to the direct action of the air or wind, and thus receives a revolving motion.

What I claim as new, and desire to secure by Letters Patent, is—

1. The lower and upper plates G H, connected together by the blades F, to form the exhaust-fan, and supporting on top the motor-fan J, and on the bottom the motor-fan L, all constructed and combined to operate substantially as described.

2. The blades F of the exhaust-fan, confined between the lower and upper plates G H, and their ends terminating within the cylinder C above the flue D, in combination with the curved blades J arranged above the exhaust-fan, and the curved blades L below the exhaust-fan, the whole being constructed to operate substantially as set forth.

3. The curved blades F of the exhaust-fan, confined between the lower and upper plates G H, their ends terminating within the cylinder C above the flue D, in combination with the curved blades J, arranged above the exhaust-fan, substantially as described.

In testimony that I claim the foregoing I have hereunto set my hand this 21st day of October, 1874.

FRANCIS BRENZINGER.

Witnesses:

W. HAUFF,

E. F. KASTENHUBER.